Jan. 18, 1966 R. R. SHAW 3,229,397
STRIP CARTRIDGE
Filed Jan. 14, 1964
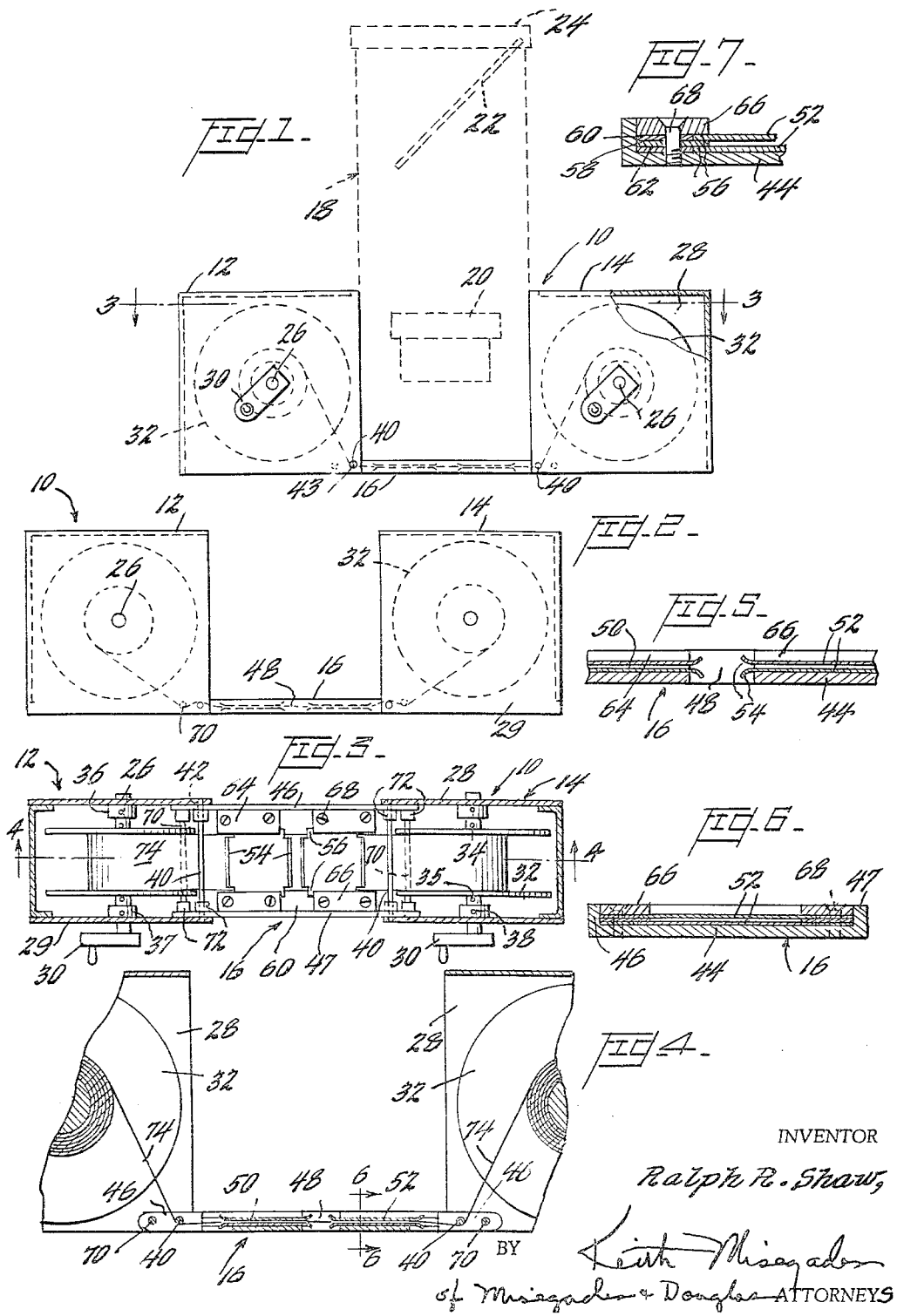
INVENTOR
Ralph R. Shaw,
BY
of Misegades & Douglas ATTORNEYS

United States Patent Office 3,229,397
Patented Jan. 18, 1966

3,229,397
STRIP CARTRIDGE
Ralph R. Shaw, New Brunswick, N.J.
(P.O. Box 5426, Honolulu, Hawaii 96822)
Filed Jan. 14, 1964, Ser. No. 337,569
15 Claims. (Cl. 40—86)

This invention relates to equipment for use with books or other matter, reduced in size by a factor of approximately four diameters or more, and printed on narrow, opaque strips of paper or other suitable material. Specifically, the invention relates to a cartridge used to support such a strip in position for projection, as by a simple, opaque projector. More importantly, the invention relates to a type of cartridge that is reversible, so as to display first one side and then the other of an opaque strip printed on both sides.

The printed strip above referred to may be called a "microbook." Heretofore most microbooks have been printed on microfilm, the microfilm then being placed on reels or, occasionally, in a closed cartridge for use with a variety of projection or reading devices. While it is preferable to have microfilm enclosed in a sealed cartridge to prevent the film from being contaminated by handling or dust, such a cartridge will not prevent the film from being subjected to changes in temperature or humidity which tend to deteriorate the film used. Further, a microfilm cartridge must be rewound before being used again, as microfilm is translucent, requiring that the film travel through a projection or reading apparatus in a single direction only.

In this instance, printed paper is preferable to the use of microfilm because of the lower cost of paper and the lasting qualities thereof. Furthermore, one side of the opaque strip may be read and then the cartridge may be reversed on the projection apparatus so that the other side of the strip may be used, negating the need for ever rewinding the strip. Finally, since the strip is printed on both sides, it need only be half the length of a corresponding strip of film, thereby substantially reducing the size and cost of the cartridge.

It is therefore an object of this invention to provide a cartridge for holding a dual-sided printed strip of paper or other opaque material enclosed therein for use with a projector or other reading apparatus.

It is another object of the invention to provide a cartridge, of the type above described, comprising two reel boxes, for holding the printed strip, having a view plate mounted therebetween for use with a reading apparatus.

It is still another object to provide a cartridge for a printed roll of paper having reel boxes mounted on opposite sides of a view plate in pivotal relationship thereto so as to use either side of the roll of paper while maintaining the cartridge in the identical attitude with respect to the reading apparatus.

Yet another object is to provide a cartridge of the type described having a view plate adapted for use on either side thereof.

Yet another object is to provide a view plate, for use with a cartridge of the type above described, having individually adjustable apertures on either side thereof.

Finally, it is an object of this invention to provide a cartridge for use with a dual-sided printed strip of opaque material comprising two reel boxes with a view plate mounted therebetween, each of the reel boxes being provided with means for controlling the movement of the printed strip through the view plate.

Further objects of this invention will become apparent by reference to the following specification and drawings in which:

FIGURE 1 is a side elevation view showing the invention in use with a standard, opaque projector, indicated by dash lines, and having parts broken away to show detail;

FIGURE 2 is a view similar to FIGURE 1, without the projector and showing the reel boxes reversed from the position shown by FIGURE 1;

FIGURE 3 is a section taken on lines 3—3 of FIGURE 1;

FIGURE 4 is a partial section taken on the lines 4—4 of FIGURE 3;

FIGURE 5 is an enlarged view of the lower central portion of FIGURE 4;

FIGURE 6 is an enlarged section taken on lines 6—6 of FIGURE 4; and

FIGURE 7 is an enlarged view of the left hand portion of FIGURE 6.

Referring now to the drawings by reference character and in particular to FIGURES 1 and 2, there is shown a cartridge 10 comprising reel boxes 12 and 14 and view plate 16 in use with a standard opaque projector 18. The horizontal dimensions of view plate 16 are sufficient to allow projector 18 to be placed thereon, in light-tight relationship thereto, and to said reel boxes. Projector 18 is provided with a light source (not shown), lens 20 and mirror 22 for projection on an opaque view screen (not shown). Alternatively, mirror 22 may be secured to a removable cap 24, placed on projector 18, said cap being removable for projection on a transluscent screen (not shown).

Each reel box, indicated by reference numerals 12 and 14, is provided with a rotatable axle 26 mounted through side walls 28 and 29, each axle having a handle 30 for controlling the rotation of spindle 26. Handle 30 may be replaced by any means deemed desirable for controlling rotation of axle 26, such as a gear or belt and pulley means for connection to an automatic control device, such as an electric motor. Axle 26 has a reel 32 secured thereto and positioned thereon as by pins 34 and 35 (see FIGURE 3). Axle 26 may be positioned between walls 28 and 29 by sleeves 36 and 37, each having an adjusting screw 38 mounted therein.

View plate 16 is pivotly mounted to reel boxes 12 and 14 by axles 40, resting in bores 42 and 43 of side plates 28 and 29, respectively. View plate 16 comprises a base portion 44 having side walls 46 and 47, extending as ears through which axles 40 pass. Portion 44 is provided with a center aperture 48.

The particular construction of view plate 16 is best indicated by reference to FIGURES 5, 6 and 7. As shown by FIGURE 5, two pairs of aperture plates 50 and 52 are located above base portion 44, one on each side of center aperture 48. All four plates are of identical construction, having transverse curved flanges 54 and extended longitudinal side edges 56. As indicated by FIGURES 6 and 7, the two plates of each pair of aperture plates are spaced apart by a pair of strip elements 58 placed above base 44, adjacent walls 46 and 47. Additional pairs of spacing strips 60 and 62 are located vertically adjacent strip elements 58, coplanar with the upper and lower portions of aperture plate pairs 50 and 52, respectively, and horizontally adjacent longitudinal side edges 56 of aperture plate pairs 50 and 52. Two pairs of pressure plates 64 and 66, secured as by screws 68, are used to adjustably secure each pair of aperture plates 50 and 52 as desired.

The flanges 54 on the aperture plates facilitate threading of the paper strip through pairs of the plates. The pairs of aperture plates 50 and 52 may be adjusted toward and away from each other to limit the amount of field of print to be projected, by adjustment with the screws 68. Extended side edges 56 of each aperture plate should be of sufficient dimensions so as to insure integrity of the aperture plates with the view plate when the aperture plates are being adjusted. Preferably, each extended side edge 56 has a length approximately five-sixths that of the aperture plate and a width approximately one-fourth that of the aperture plate.

As seen in FIGURE 3, axles 40 extend through each outer ear of side walls 46 and 47 so as to rest in bores 42 and 43. A pair of rods 70 are mounted, one each outwardly of axles 40, through ear portions of walls 46 and 47, but not to plates 28 and 29. Axles 40 and rods 70 are each properly positioned between walls 46 and 47 by sleeves 72. Sleeves 72 have the same construction and function as sleeves 36 and 37 described above.

A dual-sided printed roll of paper 74 is mounted within the above structure as follows: one end of roll 74 is secured to one of the reels, the other end is threaded under rod 70, over axle 40, between each portion of aperture plates 50, between each portion of aperture plates 52, then over axle 40, under rod 70 and finally secured to the other reel. The strip may be read on one side by turning handle 30 of one of the boxes. When the reading operation is completed on one side of the strip, the entire cartridge 10 is removed from the reading apparatus; each box is rotated longitudinally outwardly 90° about the pivot point fromed by axles 40; cartridge 10 is then rotated about a central longitudinal axis thereof 180°; and cartridge 10 is then replaced on the reading apparatus, as shown in FIGURE 1. It will be noted here that axles 40 alone serve to guide strip 74 through view plate 16 in this inverted position. Then the handle 30 of the other reel box is turned, reversing the original winding of strip 74, so as to read the other side of the strip.

The roll of printed material may be permanently mounted within the cartridge 10 or, if desirable, it may be exchanged for another roll by dismantling the device. Alternatively, several pairs of reel boxes 12 and 14 may be used with one view plate 16. In this case, screws 68 would be removed allowing the upper portions of aperture plates 50 and 52 to be released thereby freeing roll 74. Axles 40 and rods 70 would then be removed, allowing reel boxes 12 and 14 together with roll 74 to be freed from view plate 16. New reel boxes and a new roll would then be attached to view plate 16 by reversing the above dismantling procedure.

It can be readily seen from the foregoing that I have devised a new and highly useful device in the art of microrecording. Because of the simplicity of construction and corresponding low cost of manufacturing the device, it lends itself well to adaptation in a variety of fields, such as education, statistics, etc., and while I have shown a specific use of the device, I should not be limited by the same except by the scope of the appended claims.

I claim:

1. A strip feeder and container for a roll of printed paper or the like, for use with a reading device comprising:
   (a) a pair of reel boxes, each reel box including:
      (a1) an axle mounted centrally therein; and
      (a2) a reel mounted on said axle;
   (b) a view plate including a central body having:
      (b1) a pair of flat ears extending from each end thereof;
      (b2) a channel through which the strip may be passed in the plane of the view plate; and
      (b3) an aperture through which both sides of the strip may be viewed, one from each side of the plate;
   (c) said pair of reel boxes being hingedly secured to said view plate, one to each said extended pair of said longitudinally extending ears.

2. The device of claim 1 wherein said axle extends through either side of said reel box, one extended portion of said axle having means mounted thereon for controlling the rotation of said axle.

3. The device of claim 1 wherein said axle is provided with positioning means, interiorly of said box and exteriorly of said reel, for locating said reel centrally within said box.

4. The device of claim 1 wherein each of said reel boxes is secured in swivelled relationship to said view plate, by a shaft mounted through said extended pair of said longitudinal ears to the vertical sides of said reel box, at corresponding corners of said vertical sides, so that said reel box is movable through substantially a quarter arc about an axis formed by said shaft.

5. The device of claim 1 wherein the aperture is adjustable, endwise of the view plate, on each side thereof.

6. A strip feeder and container for a roll of printed paper or the like, for use with a reading device, comprising a pair of reel boxes and a view plate having projecting ears at the ends thereof, each of said reel boxes including:
   (a) an axle mounted centrally within said box having a reel secured thereto;
   (b) means secured to said axle exteriorly of said box for controlling the rotation of said axle; and
   (c) means for pivotly securing each said box to one end of said view plate through the ears thereof, said box movable through substantially a quarter arc about an axis passing through said ears.

7. The device of claim 6 wherein said means for pivotly securing said box to said view plate comprises a shaft secured through the ears of said view plate in corresponding bores located in corners of the vertical side walls of said box.

8. The device of claim 7 wherein each said box is provided with stop means limiting rotational movement of said box about said axis passing through the ears of said view plate.

9. In a strip feeder and container comprising a roll of printed paper or the like, for use with a reading device, comprising a pair of reel boxes and a view plate, said view plate comprising:
   (a) a body portion having longitudinal vertical side walls, each extending as ears beyond said body portion, and having an aperture located centrally thereof;
   (b) two pairs of aperture plates located adjacent said aperture one to each side thereof;
   (c) means releasably securing said aperture plates to said body portion; and
   (d) means on both ends of said view plate for guiding a strip therethrough and means for securing said view plate to said reel boxes.

10. The device of claim 9 wherein each aperture plate is individually adjustable horizontally with respect to said centrally located aperture.

11. The device of claim 9 wherein said means for releasably securing said aperture plates to said body portion include spacer elements separating each coincident pair of aperture plates vertically, pressure plates overlapping the longitudinal side edges of each aperture plate, and means for securing said pressure plates to said body portion.

12. The device of claim 9 wherein said means for strip guiding and securing the reel boxes to the ends of said view plate include two pairs of shafts, one pair secured to each of the ears of each end, internally of said ears, each said pair of shafts including one shaft mountable through said ears to corresponding corners of the vertical sides of said reel box, the other of said shafts located outwardly of said first shaft between said longitudinal ears, said strip being passable between said shafts from said reel to said view plate.

13. The device of claim 9 wherein each of said aperture plates comprises a generally flat, rectangular plate having slightly upturned transverse edges and horizontally extended sides, each said extended side having a length approximately five-sixths that of said plate and a width approximately one-fourth that of said plate.

14. The device of claim 13 wherein each coincident pair of said aperture plates are spaced apart, vertically, by a pair of thin plate segments interposed between the outer side edges of said coincident portions.

15. The device of claim 13 wherein said means for securing each of said pair of coincident plate portions comprises a pair of pressure plate elements, superimposed over said aperture plate segments and said horizontally extended sides, said elements being secured to said base.

References Cited by the Examiner
UNITED STATES PATENTS

| | | | |
|---|---|---|---|
| 1,293,484 | 2/1919 | Ley | 225—84 X |
| 1,499,016 | 6/1926 | Guyton | 40—86 |
| 1,714,650 | 5/1929 | Webb | 40—86 |
| 1,752,614 | 4/1930 | Ring | 40—86 |
| 2,029,750 | 2/1936 | Young | 40—86 |
| 2,837,839 | 6/1958 | Fernbach | 35—76 |

References Cited by the Applicant
UNITED STATES PATENTS

| | | |
|---|---|---|
| 1,048,379 | 12/1912 | Warren. |
| 1,707,767 | 4/1929 | Ponting et al. |
| 2,113,578 | 4/1938 | Draeger. |
| 2,220,885 | 11/1940 | Burcky. |
| 2,381,033 | 8/1945 | Bolsey. |
| 2,485,411 | 10/1949 | Pratt et al. |
| 2,485,802 | 10/1949 | Asachika. |
| 2,912,900 | 11/1959 | Cherouvrier. |
| 2,983,462 | 5/1961 | Berlings. |

EUGENE R. CAPOZIO, *Primary Examiner.*

WILLIAM GRIEB, *Assistant Examiner.*